United States Patent
Hosseini et al.

(10) Patent No.: US 11,711,817 B2
(45) Date of Patent: Jul. 25, 2023

(54) RATE MATCHING FOR A PHYSICAL DOWNLINK SHARED CHANNEL (PDSCH)

(71) Applicant: QUALCOMM Incorporated, San Diego, CA (US)

(72) Inventors: Seyedkianoush Hosseini, San Diego, CA (US); Kazuki Takeda, Tokyo (JP); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 17/226,892

(22) Filed: Apr. 9, 2021

(65) Prior Publication Data

US 2021/0321444 A1 Oct. 14, 2021

Related U.S. Application Data

(60) Provisional application No. 63/008,198, filed on Apr. 10, 2020.

(51) Int. Cl.
*H04L 1/00* (2006.01)
*H04W 72/23* (2023.01)
(Continued)

(52) U.S. Cl.
CPC .......... *H04W 72/23* (2023.01); *H04L 1/0069* (2013.01); *H04W 72/535* (2023.01); *H04W 72/569* (2023.01)

(58) Field of Classification Search
CPC . H04W 72/1263; H04W 72/56; H04W 72/23; H04W 72/53; H04W 72/0446;
(Continued)

(56) References Cited

U.S. PATENT DOCUMENTS

2019/0045490 A1 2/2019 Davydov et al.
2019/0215781 A1* 7/2019 Jeon .................... H04W 52/325
(Continued)

FOREIGN PATENT DOCUMENTS

EP          4117369 A1 *  1/2023  .......... H04W 72/042
WO    WO-2021196232 A1 * 10/2021

OTHER PUBLICATIONS

International Search Report and Written Opinion—PCT/US2021/026747—ISA/EPO—dated Jul. 12, 2021.
(Continued)

*Primary Examiner* — David Q Nguyen
(74) *Attorney, Agent, or Firm* — Patterson & Sheridan, L.L.P.

(57) ABSTRACT

Aspects of the present disclosure provide apparatus, methods, processing systems, and computer readable mediums for performing rate matching for a physical downlink shared channel (PDSCH). An example method generally includes monitoring for at least first and second downlink control information (DCI) formats for scheduling a physical downlink shared channel (PDSCH), determining a bitwidth of a rate matching indicator field of at least one of the first DCI format or the second DCI format, and performing PDSCH rate matching for a PDSCH scheduled by a DCI of the first or second DCI format based, at least in part, on the rate matching indicator field in the DCI or a format of the DCI.

23 Claims, 8 Drawing Sheets

(51) Int. Cl.
*H04W 72/50* (2023.01)
*H04W 72/566* (2023.01)

(58) Field of Classification Search
CPC ........... H04W 72/0453; H04W 1/0013; H04W 72/044; H04L 5/0042
USPC ................................. 370/328, 329, 330, 331
See application file for complete search history.

(56) References Cited

U.S. PATENT DOCUMENTS

2019/0313385 A1  10/2019  Yang et al.
2021/0029706 A1*  1/2021  Zhou .................... H04L 1/1854

OTHER PUBLICATIONS

Oppo: "PDCCH Enhancement for URLLC", 3GPP TSG RAN WG1 #100-E, 3GPP Draft, R1-2000479, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 24, 2020-Feb. 28, 2020, Feb. 14, 2020 (Feb. 14, 2020), 17 Pages, XP051852879, Retrieved from the Internet: URL: https://www.3gpp.org/ftp/tsg_ran/wg1_rl1/TSGR1_100_e/Docs/R1-2000479.zip, R1-2000479.docx, [retrieved on Feb. 14, 2020], The whole document.

* cited by examiner

*PDSCH-Config Information Element*

```
-- ASN1START
-- TAG-PDSCH-CONFIG-START

PDSCH-Config ::=                        SEQUENCE {
    dataScramblingIdentityPDSCH             INTEGER (0..1023)                                                       OPTIONAL,   -- Need S
    dmrs-DownlinkForPDSCH-MappingTypeA      SetupRelease { DMRS-DownlinkConfig }                                    OPTIONAL,   -- Need M
    dmrs-DownlinkForPDSCH-MappingTypeB      SetupRelease { DMRS-DownlinkConfig }                                    OPTIONAL,   -- Need M tci-StatesToAddModList                  SEQUENCE (SIZE(1..maxNrofTCI-States)) OF TCI-State                      OPTIONAL,   -- Need N
    tci-StatesToReleaseList                 SEQUENCE (SIZE(1..maxNrofTCI-States)) OF TCI-StateId                    OPTIONAL,   -- Need N
    vrb-ToPRB-Interleaver                   ENUMERATED {n2, n4 }                                                    OPTIONAL,   -- Need S
    resourceAllocation                      ENUMERATED { resourceAllocationType0, resourceAllocationType1, dynamicSwitch} ,
    pdsch-TimeDomainAllocationList          SetupRelease { PDSCH-TimeDomainResourceAllocationList }                 OPTIONAL,   -- Need M
    pdsch-AggregationFactor                 ENUMERATED {n2, n4, n8 }                                                OPTIONAL,   -- Need S
    rateMatchPatternToAddModList            SEQUENCE (SIZE (1..maxNrofRateMatchPatterns)) OF RateMatchPattern       OPTIONAL,   -- Need N
    rateMatchPatternToReleaseList           SEQUENCE (SIZE (1..maxNrofRateMatchPatterns)) OF RateMatchPatternId     OPTIONAL,   -- Need N
    rateMatchPatternGroup1                  RateMatchPatternGroup                                                   OPTIONAL,   -- Need R
    rateMatchPatternGroup2                  RateMatchPatternGroup                                                   OPTIONAL,   -- Need R RateMatchPatternGroup ::=               SEQUENCE (SIZE (1..maxNrofRateMatchPatternsPerGroup)) OF CHOICE {
    cellLevel                               RateMatchPatternId,
    bwpLevel                                RateMatchPatternId
```

FIG. 4

*RateMatchPattern* Information Element

```
-- ASN1START
-- TAG-RATEMATCHPATTERN-START

RateMatchPattern ::=            SEQUENCE {
    rateMatchPatternId              RateMatchPatternId,
    patternType                     CHOICE {
        bitmaps                         SEQUENCE {
            resourceBlocks                  BIT STRING (SIZE (275)),
            symbolsInResourceBlock          CHOICE {
                oneSlot                         BIT STRING (SIZE (14)),
                twoSlots                        BIT STRING (SIZE (28))
            },
            periodicityAndPattern           CHOICE {
                n2                              BIT STRING (SIZE (2)),
                n4                              BIT STRING (SIZE (4)),
                n5                              BIT STRING (SIZE (5)),
                n8                              BIT STRING (SIZE (8)),
                n10                             BIT STRING (SIZE (10)),
                n20                             BIT STRING (SIZE (20)),
                n40                             BIT STRING (SIZE (40)),
            }                                                                           OPTIONAL,   -- Need S
            ...
        },
        controlResourceSet              controlResourceSetId
    },
    subcarrierSpacing               SubcarrierSpacing                                   OPTIONAL,   -- Cond CellLevel
    dummy                           ENUMERATED { dynamic, semiStatic },
    ...
}

-- TAG-RATEMATCHPATTERN-STOP
-- ASN1STOP
```

FIG. 5

RATE MATCHING FOR A PHYSICAL DOWNLINK SHARED CHANNEL (PDSCH)

CROSS-REFERENCE TO RELATED APPLICATIONS

This application claims benefit to U.S. Provisional Patent Application Ser. No. 63/008,198, entitled "Rate Matching for a Physical Downlink Shared Channel (PDSCH)," filed Apr. 10, 2020 and assigned to the assignee hereof, the contents of which are hereby incorporated by reference in its entirety.

TECHNICAL FIELD

Aspects of the present disclosure relate to wireless communications, and more particularly, to techniques for performing rate matching for a physical downlink shared channel (PDSCH).

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, further improvements, e.g., improvements in latency, reliability, and the like, in NR and LTE technology remain useful. Preferably, these improvements should be applicable to other multi-access technologies and the telecommunication standards that employ these technologies.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE.

SUMMARY

The systems, methods, and devices of the disclosure each have several innovative aspects, no single one of which is solely responsible for the desirable attributes.

One innovative aspect of the subject matter described in this disclosure can be implemented in a method for wireless communication by a user equipment (UE). The method generally includes monitoring for at least first and second downlink control information (DCI) formats for scheduling a physical downlink shared channel (PDSCH), determining a bitwidth of a rate matching indicator field of at least one of the first DCI format or the second DCI format, and performing PDSCH rate matching for a PDSCH scheduled by a DCI of the first or second DCI format based, at least in part, on the rate matching indicator field in the DCI or a format of the DCI.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 4 illustrates a format of an example information element used to configure UE-specific physical downlink shared channel (PDSCH) parameters, in accordance with certain aspects of the present disclosure.

FIG. 5 illustrates a format of an example information element used to configure rate matching patterns for a physical downlink shared channel (PDSCH), in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for performing rate matching for a physical downlink control channel (PDSCH) based on a format of downlink control information (DCI) scheduling reception of the PDSCH.

The following description provides examples of performing rate matching for a PDSCH based on a format of downlink control information (DCI) scheduling reception of the PDSCH, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
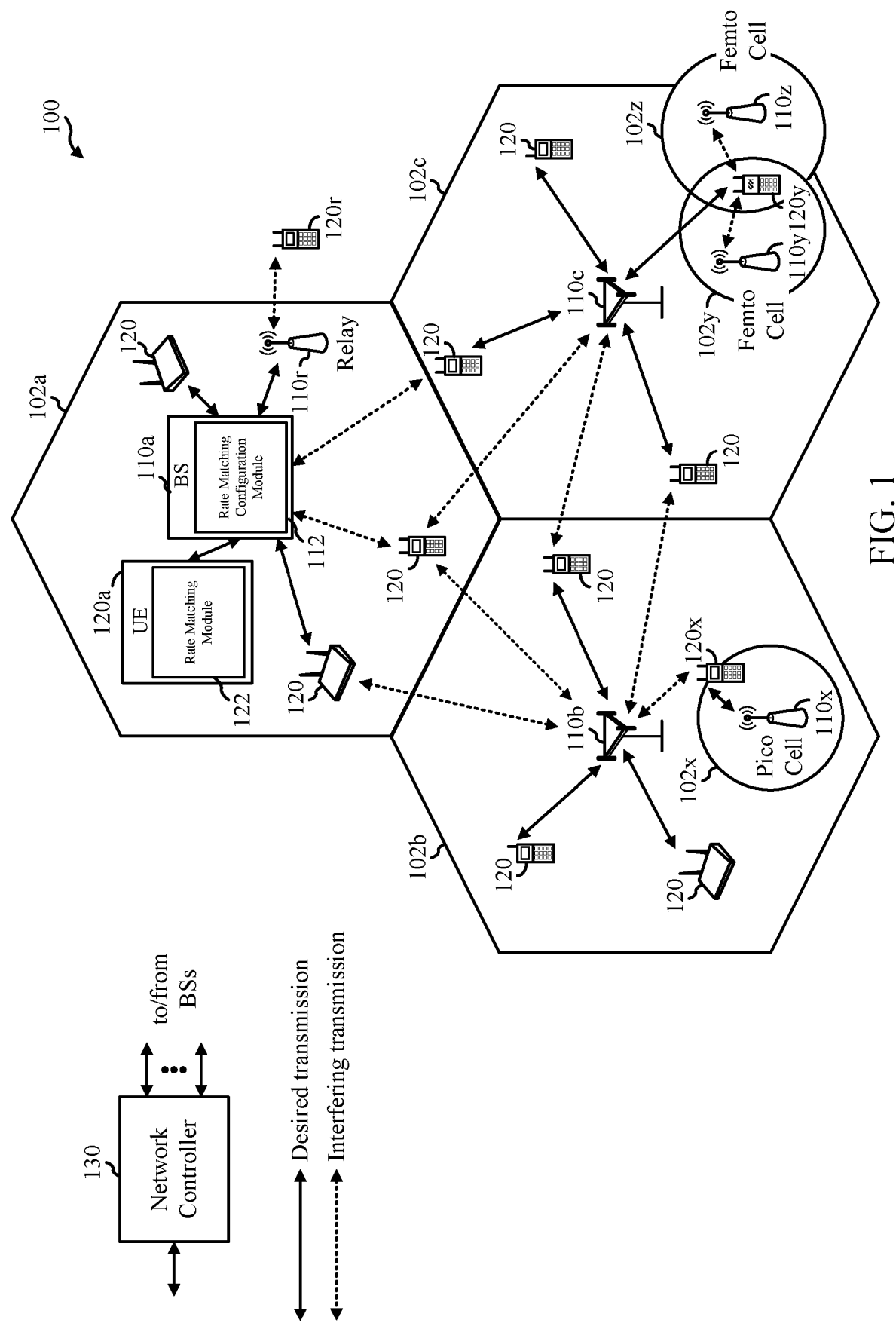
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a may include a rate matching module 122 that may be configured to perform (or cause UE 120a to perform) operations 600 of FIG. 6. Similarly, a base station 110a may include a rate matching configuration module 112 that may be configured to transmit a DCI to UE 120a to schedule a PDSCH and cause the UE to perform operations 600 of FIG. 6.

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
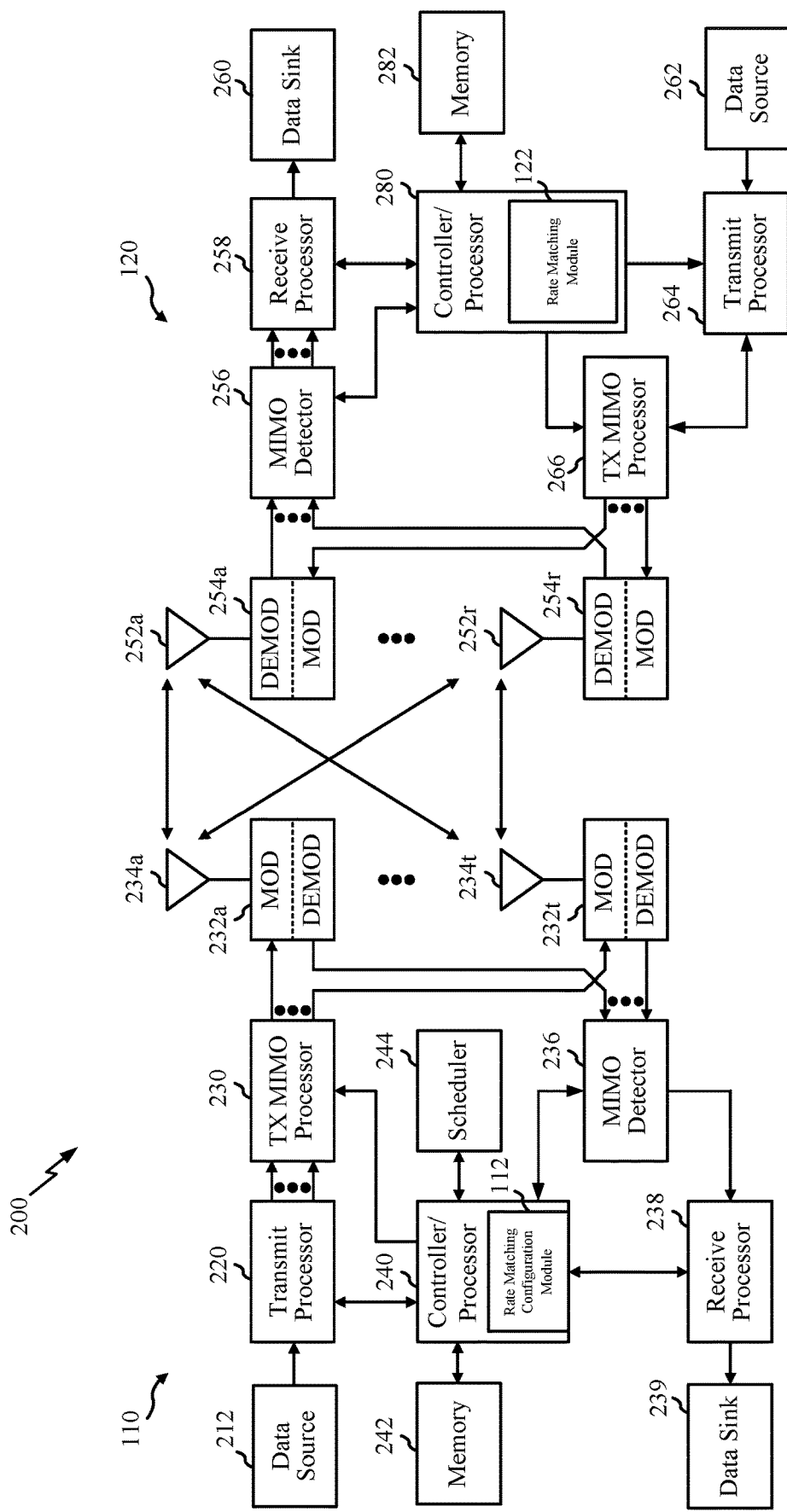
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink. In one example, memory 282 or memory 242 can be a non-transitory computer-readable medium comprising instructions (e.g., instructions that instruct a processor, e.g., controller/processor 680, controller/processor 640, or other processor) to perform any aspects of FIG. 6. Additionally or alternatively, such instructions may be copied or installed onto memory 282 or memory 242 from a non-transitory computer-readable medium.

The controller/processor 280 or other processors and modules at the UE 120 may perform or direct the execution of processes for the techniques described herein. As shown in FIG. 2, the controller/processor 280 of the UE 120 has a Rate Matching Module 122 that may be configured to perform operations 600 of FIG. 6, as discussed in further detail below. The controller/processor 240 of the base station 110 includes a Rate Matching Configuration Module 112 that may be configured to transmit a DCI to UE 120 to schedule a PDSCH and cause the UE 120 to perform operations 600 of FIG. 6. Although shown at the Controller/Processor, other components of the UE or BS may be used to perform the operations described herein.

Figure 3:
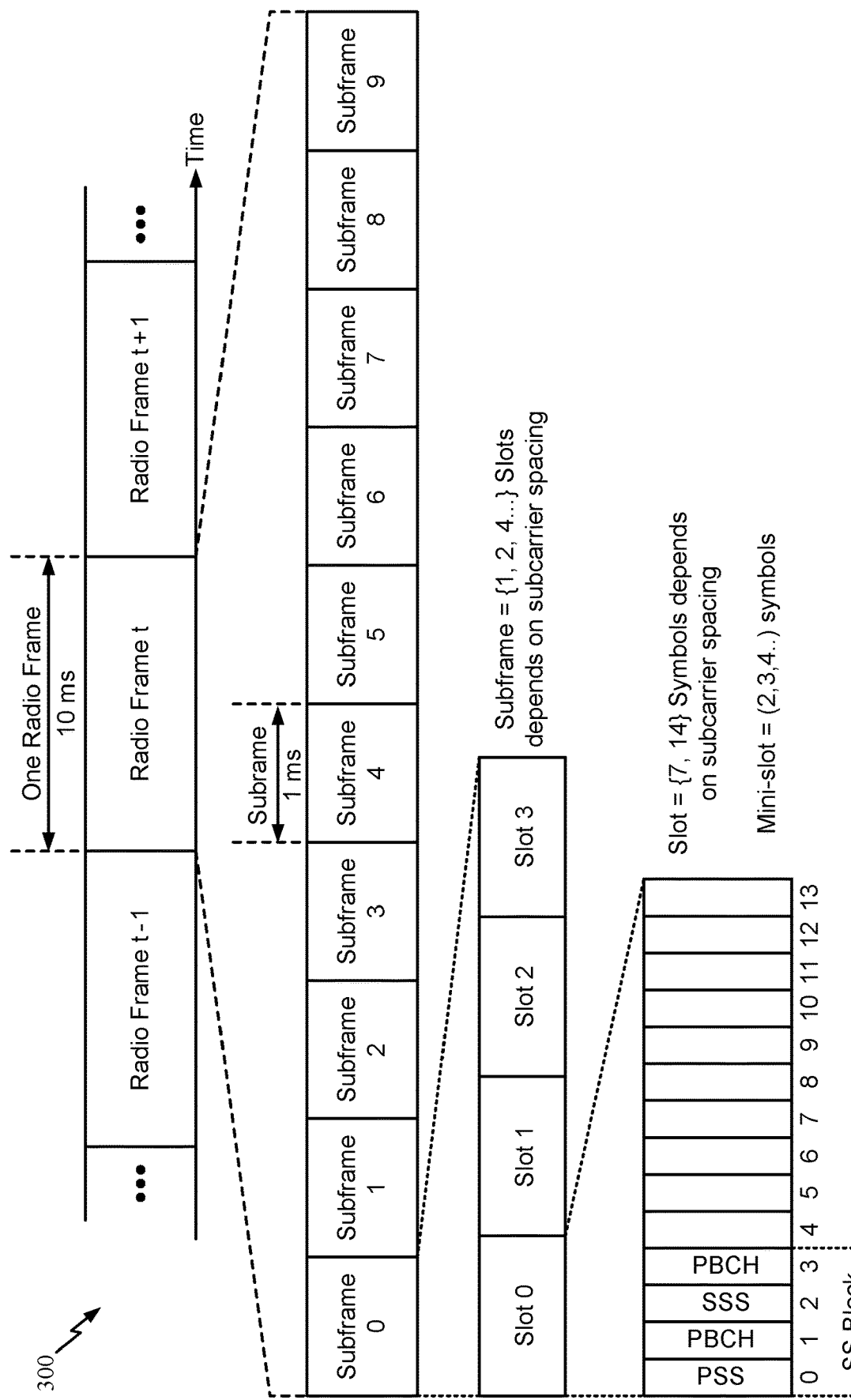
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Methods for Performing Rate Matching for a Physical Downlink Shared Channel (PDSCH) Based on a Downlink Control Information Format Aspects of the present disclosure provide apparatus, methods, processing systems, and computer readable mediums for performing rate matching for a physical downlink control channel (PDSCH) based on a format of downlink control information (DCI) scheduling reception of the PDSCH.

FIG. 4 illustrates the format of an information element, the PDSCH-Config information element, used to configure PDSCH parameters. The PDSCH-Config information element, as illustrated, may include information about at least a first rate matching pattern group and a second rate matching pattern group, rateMatchPatternGroup1 and rateMatchPatternGroup2. Both the information about the first rate matching pattern group and the second rate matching pattern group may include information about a cell-level rate matching pattern and a bandwidth part rate matching pattern. The information about these rate matching patterns may be an identifier of a specific rate matching pattern. In some aspects, a UE may be configured with a maximum of four rate matching patterns, and a maximum of eight rate matching patterns per group.

FIG. 5 illustrates the format of an information element, the RateMatchPattern information element, used to configure a rate matching pattern for a PDSCH. As illustrated, a rate matching pattern may be associated with a name, resources included in the pattern, a periodicity or pattern for the rate matching pattern, and a control resource set (CORESET) identifier. The resources may be the resources around which a PDSCH may be rate matched, as discussed in further detail below.

In DCI format 1_1, the rate matching indicator may be zero, one, or two bits according to the higher layer parameters rateMatchPatternGroup1 and rateMatchPatternGroup2. The most significant bit of the rate matching indicator may be used to indicate rateMatchPatternGroup1. The least significant bit of the rate matching indicator may be used to indicate rateMatchPatternGroup2.

A configured group of rate matching patterns may contain a list of resource block and symbol level resource set indicates forming a union of resource sets that are unavailable for use by a PDSCH, if a corresponding bit of the rate matching indicator field of DCI format 1_1 scheduling the PDSCH is equal to one. The resource elements (REs) corresponding to the union of configured RB-symbol level resource sets that are not included in either the first rate matching pattern group (rateMatchPatternGroup1) or the second rate matching pattern group (rateMatchPatternGroup2) may not be available for the PDSCH scheduled by DCI format 1_1. When a UE receives a PDSCH scheduled by DCI format 1_0 or with semipersistent scheduling activated by DCI format 1_0, the REs corresponding to configured resources in the first or second rate matching pattern groups may not be available for use by the PDSCH. For a bitmap pair included in one or both of the first and second rate matching pattern groups, the dynamic indication of resource availability for the PDSCH may apply to a set of slots where the parameter rateMatchPatternToAddModList is present among the slots for the scheduled PDSCH.

In Release 16, a new DCI format, DCI format 1_2, may be used to schedule the PDSCH. Like DCI format 1_1, DCI format 1_2 may include a rate matching field with a bitwidth that may be configured to be zero, one, or two bits. The bitwidth of the rate matching indicator field and the configuration of the first and second rate matching pattern groups may be configured separately and independently for DCI format 1_1 and DCI format 1_2.

A UE may be configured to monitor for one or both of DCI format 1_1 or DCI format 1_2 for scheduling a PDSCH on a given serving cell. Because the bitwidth of the rate matching field may be independently configured in DCI format 1_1 and DCI format 1_2, PDSCH rate mapping may be performed as discussed in further detail below.

Figure 6:
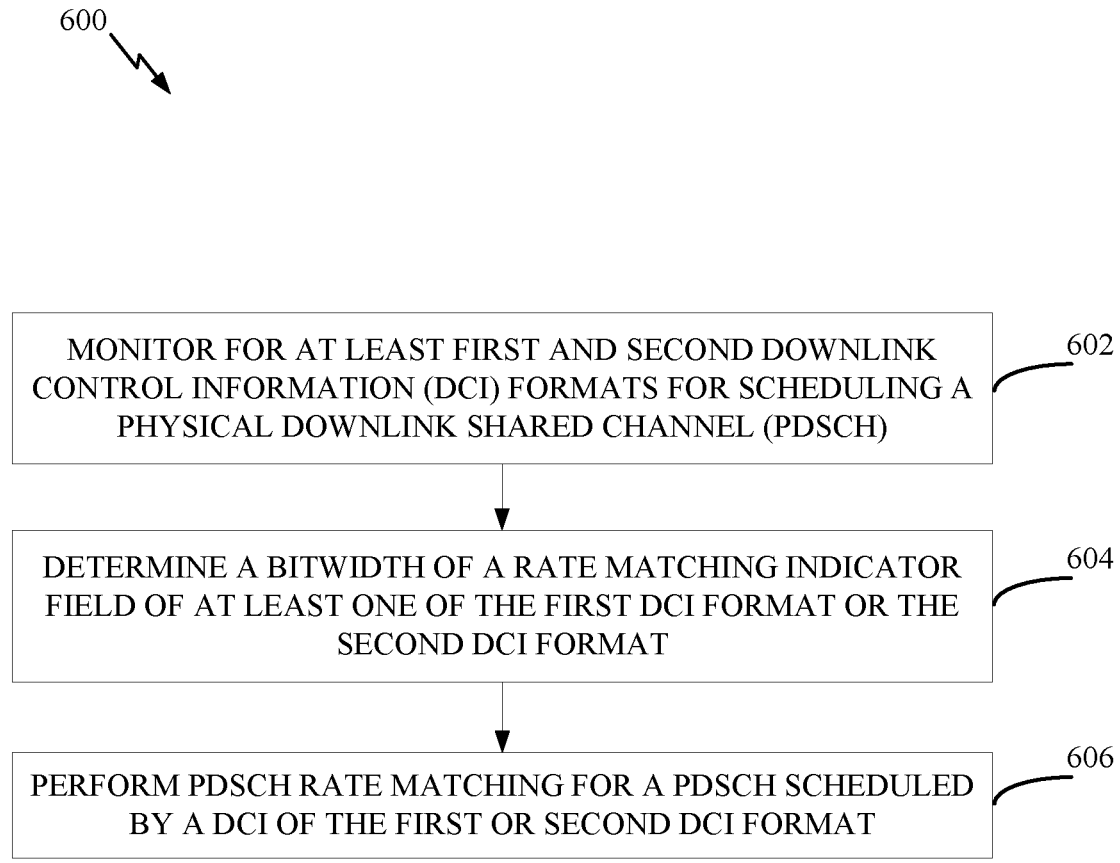
FIG. 6 illustrates example operations that may be performed by a user equipment (UE) to perform rate matching for a physical downlink shared channel (PDSCH) based on a format of downlink control information (DCI) scheduling reception of the PDSCH, in accordance with certain aspects of the present disclosure.

FIG. 6 illustrates example operations for performing rate matching for a PDSCH, according to certain aspects discussed herein. As illustrated, operations 600 may begin at block 602, where the UE monitors for at least a first and second downlink control information (DCI) formats for scheduling a PDSCH. The first and second DCI formats may correspond to one of DCI format 1_0, DCI format 1_1, or DCI format 1_2.

At block 604, the UE determines a bitwidth of a rate matching indicator field of at least one of the first DCI format or the second DCI format.

At block 606, the UE performs PDSCH rate matching for a PDSCH scheduled by a DCI of the first or second DCI format. The rate matching performed for the scheduled PDSCH may be based, at least in part, on a format of the DCI scheduling the PDSCH and/or the rate matching indicator field (e.g., the bitwidth of the rate matching indicator field, content in the rate matching indicator field, etc.).

In some aspects, the UE may monitor for DCI formats 1_1 and 1_2 for PDSCH scheduling on a given serving cell. If the bitwidth of the rate matching indicator is non-zero (e.g., one or two bits) for DCIs received using formats 1_1 and 1_2, the UE may perform rate matching based on the rate matching indication included in the corresponding DCI scheduling the PDSCH. That is, if a DCI using format 1_1 schedules a PDSCH, the UE can rate match based on the indication in the DCI using format 1_1; likewise, if a DCI using format 1_2 schedules the PDSCH, the UE can rate match based on the indication in the DCI using format 1_2. In some aspects, the RRC parameters based on which rate matching may be performed, as discussed in further detail herein, may be based on the format of the DCI. For example, rate match pattern group parameters may be used based on the format of the DCI (e.g., rateMatchPatternGroup1 and rateMatchPatternGroup2 may be used when the DCI is in format 1_1, while rateMatchPatternGroup1-ForDCIFormat1_2 and rateMatchPatternGroup2-ForDCIFormat1_2 may be used when the DCI is in format 1_2).

In some aspects, the bitwidth of the rate matching indicator in a first DCI format may be 0, and the bitwidth of the rate matching indicator in a second DCI format may be non-zero (e.g., 1 bit or 2 bits). In some cases, to perform rate matching, a UE may rate match the PDSCH scheduled by the DCI using the second DCI format around REs corresponding to configured resources in the first or second rate matching pattern groups included in the second DCI format, if such rate matching pattern groups are configured.

In some aspects, when bitwidth of the rate matching indicator in a first DCI format is zero and the bitwidth of the rate matching indicator in a second DCI format is non-zero (e.g., 1 bit or 2 bits), the UE may perform rate matching based on rate matching patterns that do not belong to either a first rate matching pattern or a second rate matching pattern. Because the rate matching pattern groups may not be configured for the DCI using the first DCI format, the UE may perform rate matching based on rate matching patterns that are not included in the rate matching patterns identified in a DCI using the second DCI format.

In some aspects, when bitwidth of the rate matching indicator in a first DCI format is zero and the bitwidth of the rate matching indicator in a second DCI format is non-zero (e.g., 1 bit or 2 bits), the UE may perform rate matching based on any rate matching pattern. The UE may, for example, perform rate matching using the rate matching patterns identified in all of the rate matching pattern groups.

In some aspects, the rate matching field may be configured by the network entity together for both the first and the second DCI formats. In such a case, the bitwidths may be the same or different. The UE may perform rate matching based on the rate matching patterns included in both the first and the second DCI formats. In some aspects, the UE may not perform any rate matching based on the rate matching pattern(s) included in either the first or the second DCI formats.

In some aspects, a PDSCH may be scheduled by DCI format 1_0 or activated using semipersistent scheduling by DCI format 1_0. The UE may be configured to monitor both DCI formats 1_1 and 1_2. The UE may perform rate matching based on rate matching patterns that do not belong to either rate matching pattern group for the monitored DCI format (e.g., where the UE receives a DCI using format 1_2, the rate matching patterns identified in rateMatchPattern-Group1 or rateMatchPatternGroup2 in the DCI using DCI format 1_2). The UE may perform rate matching based on any rate matching pattern, including those identified in the rate matching pattern groups for the monitored DCI format.

In some aspects, the DCI formats may indicate a priority level for scheduling the PDSCH. For example, DCI format 1_1 may indicate a low priority level, and DCI format 1_2 may indicate a high priority level, or vice versa. In such a case, rate matching for the PDSCH scheduled by DCI format 1_0 may be based on pattern groups identified for the low priority level DCI format.

In some aspects, where a PDSCH is scheduled by DCI format 1_0 or with semipersistent scheduling activated by DCI format 1_0, and the UE is configured to monitor for only DCI format 1_2 (and not monitor for DCI format 1_1), the UE may perform rate matching such that the resources identified in the rate matching pattern groups in DCI format 1_2 are not available for the PDSCH.

Figure 7:
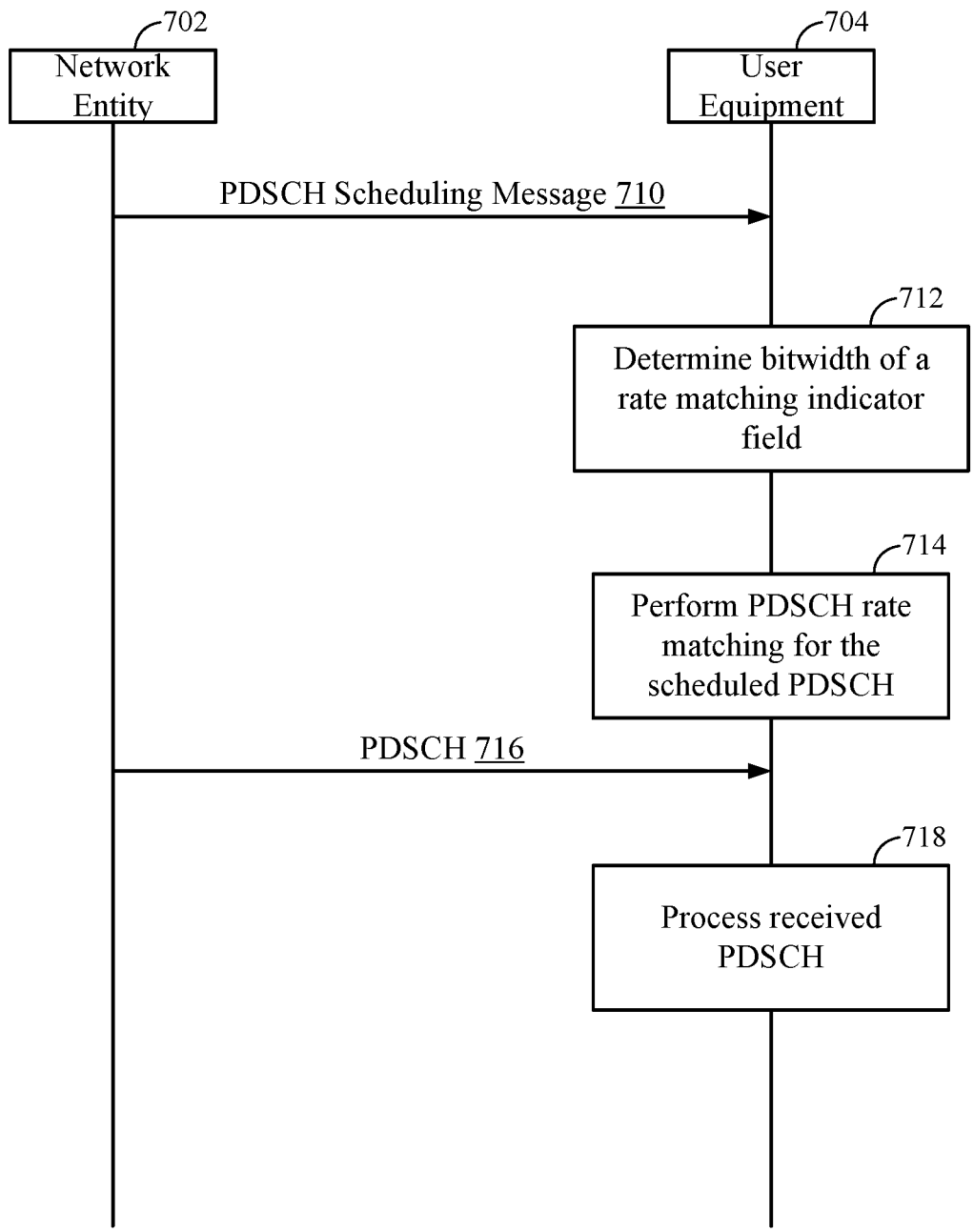
FIG. 7 is a message flow diagram illustrating messages that may be exchanged between a user equipment (UE) and a network entity to configure and perform rate matching for a physical downlink shared channel (PDSCH) based on a format of downlink control information (DCI) scheduling reception of the PDSCH, in accordance with certain aspects of the present disclosure.

FIG. 7 is a message flow diagram illustrating messages that may be exchanged between a user equipment (UE) and a network entity to configure and perform rate matching for a physical downlink shared channel (PDSCH) based on a format of downlink control information (DCI) scheduling reception of the PDSCH, in accordance with certain aspects of the present disclosure.

As illustrated, a network entity 702 can transmit a PDSCH scheduling message 710 to the UE 704. The PDSCH scheduling message 710 may be, for example, a DCI message that schedules reception of the PDSCH and may be formatted in one of a plurality of formats. As discussed above, the DCI message may be formatted in one of DCI format 1_0, DCI format 1_1, or DCI format 1_2, with each format in which the DCI message is format being associated with various rules for rate matching for the PDSCH scheduled by the DCI.

At block 712, the UE 704 determines a bitwidth of a rate matching indicator field of at least one of the first DCI format or the second DCI format. The bitwidth of the rate matching indicator field may be, for example, a 0-bit width in a DCI formatted using the first DCI format, and the bitwidth of the rate matching indicator in a DCI formatted using the second DCI format may be a non-zero value (e.g., 1 bit or 2 bits).

At block 714, the UE performs rate matching for the scheduled PDSCH. As discussed, the UE can rate match for the scheduled PDSCH based on one or more of the rate matching indicator field in the DCI scheduling the PDSCH (e.g., PDSCH scheduling message 710) or the format of the DCI scheduling the PDSCH. For example, rate matching may be performed for a first PDSCH based on the rate matching indicator field in the first DCI format, and rate matching may be performed for a second PDSCH based on the rate matching indicator field in the second DCI format. In some aspects, the rate matching may be based on a bitwidth of the rate matching indicator field in one of the DCI formats. As discussed herein, varying techniques can be used for rate matching a PDSCH scheduled by a second DCI format when the bitwidth of the rate matching indicator in the first DCI format is zero. In some aspects, the rate matching may be based on a format of the DCI scheduling the PDSCH (e.g., PDSCH scheduling message 710), where various rules for rate matching being associated with different DCI formats.

The UE may subsequently receive transmissions 716 on the PDSCH. At block 718, the UE processes the received PDSCH based on the rate matching performed at block 714.

Figure 8:
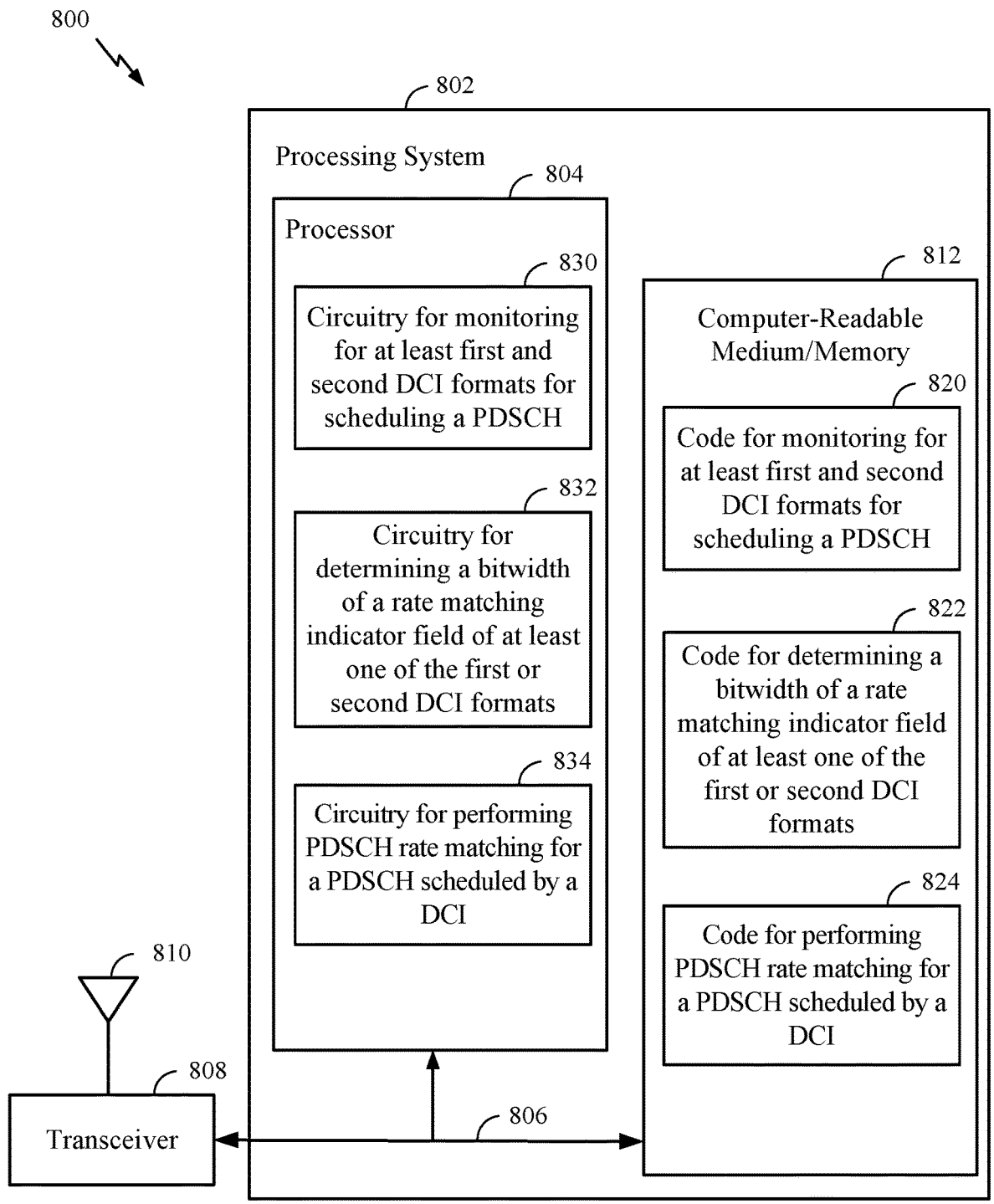
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 6. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 6, or other operations for performing the various techniques discussed herein for performing rate matching for a physical downlink control channel (PDSCH) based on a format of downlink control information (DCI) scheduling reception of the PDSCH. In certain aspects, computer-readable medium/memory 812 stores code 820 for monitoring for at least first and second downlink control information (DCI) formats for scheduling a physical downlink shared channel (PDSCH); code 822 for determining a bitwidth of a rate matching indicator field; and code 824 for performing rate matching for a PDSCH scheduled by a DCI. In certain aspects, the processor 804 has circuitry configured to implement the code stored in the computer-readable medium/memory 812. The processor 804 includes circuitry 820 for monitoring for at least first and second downlink control information (DCI) formats for scheduling a physical downlink shared channel (PDSCH); circuitry 822 for determining a bitwidth of a rate matching indicator field; and circuitry 824 for performing rate matching for a PDSCH scheduled by a DCI.

Example Clauses

Clause 1: A method for wireless communications by a user equipment (UE), comprising: monitoring for at least first and second downlink control information (DCI) formats for scheduling a physical downlink shared channel (PDSCH); determining a bitwidth of a rate matching indicator field of at least one of the first DCI format or the second DCI format; and performing PDSCH rate matching for a PDSCH scheduled by a DCI of the first or second DCI format based, at least in part, on the rate matching indicator field in the DCI or a format of the DCI.

Clause 2: The method of Clause 1, wherein the rate matching comprises: rate matching for a first PDSCH based on the rate matching indicator field in the first DCI format; and rate matching for a second PDSCH based on the rate matching indicator field in the second DCI format.

Clause 3: The method of Clause 1 or 2, wherein: the bitwidth of the rate matching indicator field in the first DCI format is zero.

Clause 4: The method of Clause 3, wherein the rate matching comprises: rate matching the PDSCH scheduled by the second DCI format around REs corresponding to configured resources in rate matching pattern groups included in the second DCI format.

Clause 5: The method of Clause 3, wherein the rate matching comprises: rate matching the PDSCH based on rate matching patterns that do not belong to rate matching pattern groups included in the second DCI format.

Clause 6: The method of Clause 3, wherein the rate matching comprises: rate matching a PDSCH based on any configured rate matching pattern, including rate matching patterns specified by rate matching pattern groups included in the second DCI format.

Clause 7: The method of any of Clauses 1 through 6, wherein the PDSCH is scheduled by DCI format 1_0 or using semi-persistent scheduling activated by DCI format 1_0.

Clause 8: The method of Clause 7, wherein: the second DCI format schedules a PDSCH using DCI format 1_2, and the rate matching comprises rate matching the PDSCH based on rate matching patterns that do not belong to rate matching pattern groups included in the second DCI format.

Clause 9: The method of Clause 7, wherein the rate matching comprises: rate matching the PDSCH based on any configured rate matching pattern, including rate matching patterns specified by rate matching pattern groups included in the second DCI format.

Clause 10: The method of Clause 7, wherein: the first DCI format corresponds to a low priority level, the second DCI format corresponds to a high priority level, and the rate matching the PDSCH comprises rate matching for a PDSCH based on pattern groups identified in the first DCI format.

Clause 11: The method of any of Clauses 1 through 10, wherein the first DCI format schedules a PDSCH using DCI format 1_0 and the second DCI schedules a PDSCH using DCI format 1_2.

Clause 12: An apparatus for wireless communications, comprising: a memory; and a processor configured to perform the operations of any of Clauses 1 through 11.

Clause 13: An apparatus for wireless communications, comprising: means for performing the operations of any of Clauses 1 through 11.

Clause 14: A computer-readable medium having instructions stored thereon which, when executed by a processor, performs the operations of any of Clauses 1 through 11.

Additional Considerations

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. ABS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using time division duplexing (TDD). In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), comprising:
    monitoring for at least first and second downlink control information (DCI) formats for scheduling a physical downlink shared channel (PDSCH), wherein the second DCI format schedules a PDSCH using DCI format 1_2;
    determining a bitwidth of a rate matching indicator field of at least one of the first DCI format or the second DCI format; and
    performing PDSCH rate matching for a PDSCH scheduled by a DCI of the first or second DCI format based, at least in part, on the rate matching indicator field in the DCI or on a format of the DCI, wherein the PDSCH is scheduled by the DCI of DCI format 1_0 or by using semi-persistent scheduling activated by the DCI of DCI format 1_0, and wherein performing the PDSCH rate matching comprises rate matching the PDSCH based on rate matching patterns that do not belong to rate matching pattern groups included in the second DCI format.

2. The method of claim 1, wherein the rate matching comprises:
    rate matching for a first PDSCH based on the rate matching indicator field in the first DCI format; and
    rate matching for a second PDSCH based on the rate matching indicator field in the second DCI format.

3. The method of claim 1, wherein: the bitwidth of the rate matching indicator field in the first DCI format is zero.

4. The method of claim 3, wherein the rate matching comprises:
    rate matching the PDSCH scheduled by the second DCI format around REs corresponding to configured resources in rate matching pattern groups included in the second DCI format.

5. The method of claim 3, wherein the rate matching comprises:
    rate matching a PDSCH based on any configured rate matching pattern, including rate matching patterns specified by rate matching pattern groups included in the second DCI format.

6. The method of claim 1, wherein the rate matching further comprises:
    rate matching the PDSCH based on any configured rate matching pattern, including rate matching patterns specified by rate matching pattern groups included in the second DCI format.

7. The method of claim 1, wherein:
    the first DCI format corresponds to a low priority level,
    the second DCI format corresponds to a high priority level, and
    the rate matching the PDSCH comprises rate matching for a PDSCH based on pattern groups identified in the first DCI format.

8. The method of claim 1, wherein the first DCI format schedules a PDSCH using DCI format 1_0 and the second DCI schedules a PDSCH using DCI format 1_2.

9. An apparatus for wireless communications by a user equipment, comprising:
    a processor configured to:
        monitor for at least first and second downlink control information (DCI) formats for scheduling a physical downlink shared channel (PDSCH), wherein the second DCI format schedules a PDSCH using DCI format 1_2,
        determine a bitwidth of a rate matching indicator field of at least one of the first DCI format or the second DCI format, and
        perform PDSCH rate matching for a PDSCH scheduled by a DCI of the first or second DCI format based, at least in part, on the rate matching indicator field in the DCI or on a format of the DCI, wherein the PDSCH is scheduled by the DCI of DCI format 1_0 or by using semi-persistent scheduling activated by the DCI of DCI format 1_0, and wherein performing the PDSCH rate matching comprises rate matching the PDSCH based on rate matching patterns that do not belong to rate matching pattern groups included in the second DCI format; and
    a memory.

10. The apparatus of claim 9, wherein the rate matching comprises:
    rate matching for a first PDSCH based on the rate matching indicator field in the first DCI format; and
    rate matching for a second PDSCH based on the rate matching indicator field in the second DCI format.

11. The apparatus of claim 9, wherein: the bitwidth of the rate matching indicator field in the first DCI format is zero.

12. The apparatus of claim 11, wherein the rate matching comprises:
    rate matching the PDSCH scheduled by the second DCI format around REs corresponding to configured resources in rate matching pattern groups included in the second DCI format.

13. The apparatus of claim 11, wherein the rate matching comprises:

rate matching a PDSCH based on any configured rate matching pattern, including rate matching patterns specified by rate matching pattern groups included in the second DCI format.

14. The apparatus of claim 9, wherein the rate matching further comprises:
rate matching the PDSCH based on any configured rate matching pattern, including rate matching patterns specified by rate matching pattern groups included in the second DCI format.

15. The apparatus of claim 9, wherein:
the first DCI format corresponds to a low priority level,
the second DCI format corresponds to a high priority level, and
the rate matching the PDSCH further comprises rate matching for a PDSCH based on pattern groups identified in the first DCI format.

16. The apparatus of claim 9, wherein the first DCI format schedules a PDSCH using DCI format 1_0 and the second DCI schedules a PDSCH using DCI format 1_2.

17. An apparatus for wireless communications by a user equipment (UE), comprising:
means for monitoring for at least first and second downlink control information (DCI) formats for scheduling a physical downlink shared channel (PDSCH), wherein the second DCI format schedules a PDSCH using DCI format 1_2;
means for determining a bitwidth of a rate matching indicator field of at least one of the first DCI format or the second DCI format; and
means for performing PDSCH rate matching for a PDSCH scheduled by a DCI of the first or second DCI format based, at least in part, on the rate matching indicator field in the DCI or on a format of the DCI, wherein the PDSCH is scheduled by the DCI of DCI format 1_0 or by using semi-persistent scheduling activated by the DCI of DCI format 1_0, and wherein performing the PDSCH rate matching comprises rate matching the PDSCH based on rate matching patterns that do not belong to rate matching pattern groups included in the second DCI format.

18. The apparatus of claim 17, wherein the rate matching comprises:
rate matching for a first PDSCH based on the rate matching indicator field in the first DCI format; and
rate matching for a second PDSCH based on the rate matching indicator field in the second DCI format.

19. The apparatus of claim 17, wherein the bitwidth of the rate matching indicator field in the first DCI format is zero.

20. The apparatus of claim 19, wherein the rate matching further comprises one or more of:
rate matching the PDSCH scheduled by the second DCI format around REs corresponding to configured resources in rate matching pattern groups included in the second DCI format,
rate matching the PDSCH based on rate matching patterns that do not belong to rate matching pattern groups included in the second DCI format, or
rate matching the PDSCH based on any configured rate matching pattern, including rate matching patterns specified by rate matching pattern groups included in the second DCI format.

21. The apparatus of claim 17, wherein:
the first DCI format corresponds to a low priority level,
the second DCI format corresponds to a high priority level, and
the rate matching the PDSCH further comprises rate matching for a PDSCH based on pattern groups identified in the first DCI format.

22. The apparatus of claim 17, wherein the first DCI format schedules a PDSCH using DCI format 1_0 and the second DCI schedules a PDSCH using DCI format 1_2.

23. A computer-readable medium having instructions stored thereon which, when executed by a processor, performs an operation for wireless communications by a user equipment (UE), the operation comprising:
monitoring for at least first and second downlink control information (DCI) formats for scheduling a physical downlink shared channel (PDSCH), wherein the second DCI format schedules a PDSCH using DCI format 1_2;
determining a bitwidth of a rate matching indicator field of at least one of the first DCI format or the second DCI format; and
performing PDSCH rate matching for a PDSCH scheduled by a DCI of the first or second DCI format based, at least in part, on the rate matching indicator field in the DCI or on a format of the DCI, wherein the PDSCH is scheduled by the DCI of DCI format 1_0 or by using semi-persistent scheduling activated by the DCI of DCI format 1_0, and wherein performing the PDSCH rate matching comprises rate matching the PDSCH based on rate matching patterns that do not belong to rate matching pattern groups included in the second DCI format.

* * * * *